Feb. 25, 1958  D. K. STUDENICK  2,824,516
DEPTH MEASURING DEVICE FOR MOORING MINES
Filed Feb. 28, 1957  4 Sheets-Sheet 1
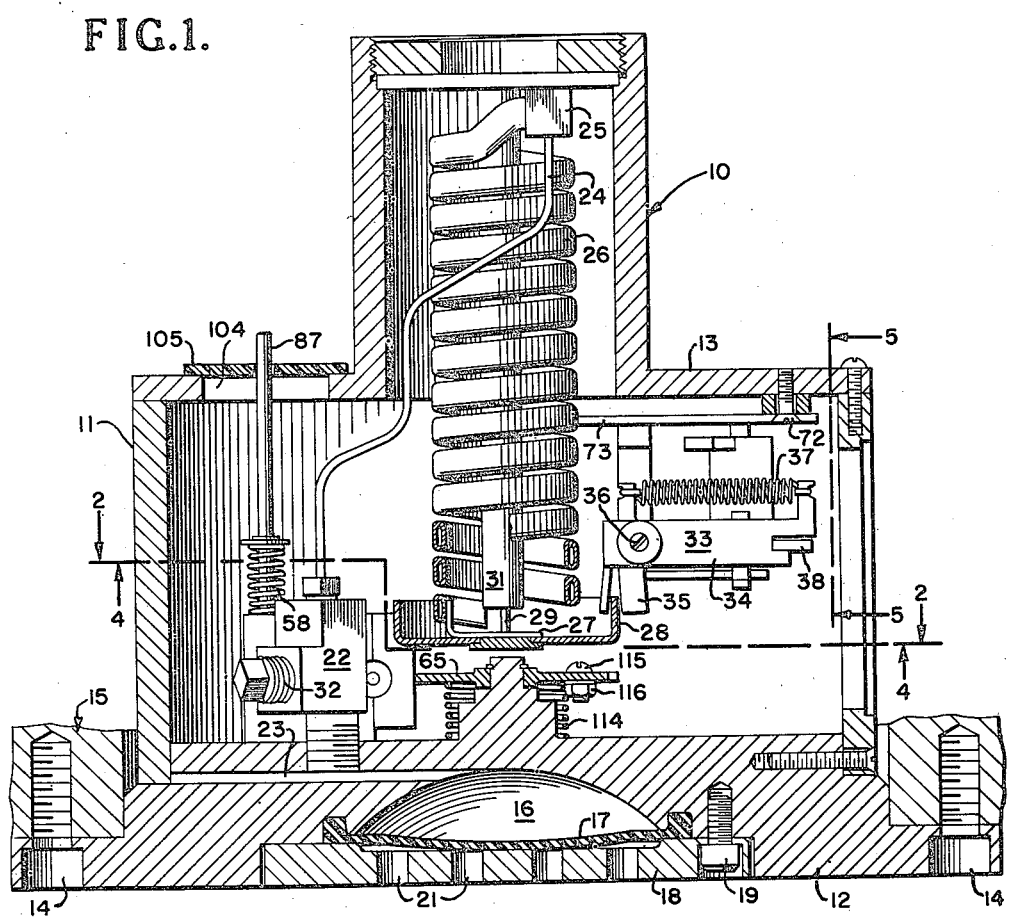
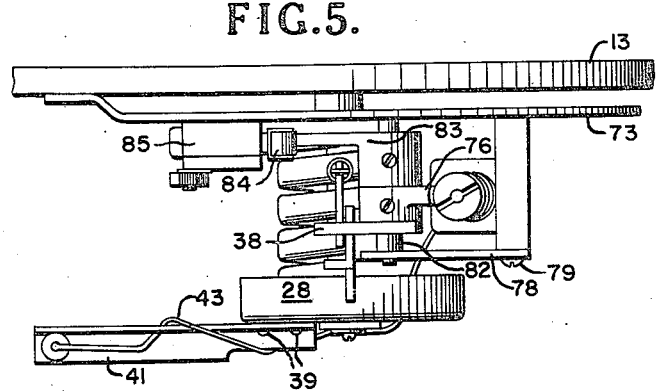
INVENTOR.
D. K. STUDENICK
BY
ATTYS Feb. 25, 1958   D. K. STUDENICK   2,824,516
DEPTH MEASURING DEVICE FOR MOORING MINES
Filed Feb. 28, 1957   4 Sheets-Sheet 2
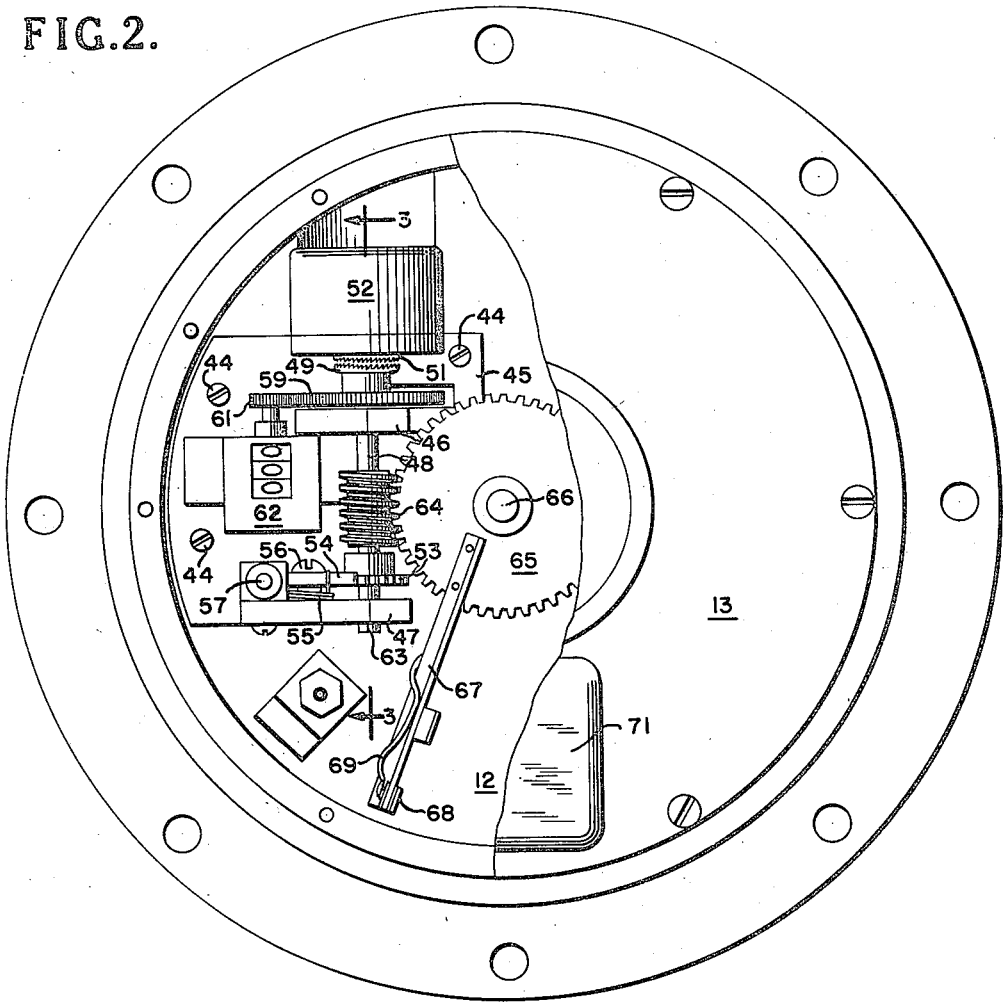
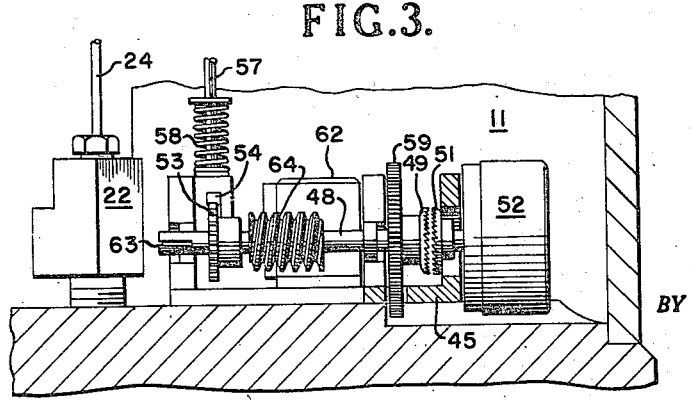
INVENTOR.
D. K. STUDENICK Feb. 25, 1958     D. K. STUDENICK     2,824,516
DEPTH MEASURING DEVICE FOR MOORING MINES
Filed Feb. 28, 1957     4 Sheets-Sheet 3

INVENTOR.
D. K. STUDENICK
BY
ATTYS

Feb. 25, 1958  D. K. STUDENICK  2,824,516
DEPTH MEASURING DEVICE FOR MOORING MINES
Filed Feb. 28, 1957  4 Sheets-Sheet 4

INVENTOR.
D. K. STUDENICK
BY
ATTYS

United States Patent Office 2,824,516
Patented Feb. 25, 1958

2,824,516
DEPTH MEASURING DEVICE FOR MOORING MINES

David K. Studenick, Silver Spring, Md., assignor to the United States of America as represented by the Secretary of the Navy Application February 28, 1957, Serial No. 643,205
11 Claims. (Cl. 102—13)
(Granted under Title 35, U. S. Code (1952), sec. 266)

The invention described herein may be manufactured and used by or for the Government of the United States of America for governmental purposes without the payment of any royalties thereon or therefor.

This invention relates to a submerged moored mine and more particularly to means for mooring the mine at a predetermined selected depth when a sufficient number of magnetic signals have been received from the mooring cable of the cable mine by a magnetic measuring device to lock the cable to the mine anchor.

In devices of this character heretofore devised it has been the usual practice to employ a plummet line arrangement in which a length of plummet line is payed out from the anchor corresponding to the depth at which the mine is to be moored. Other devices employ a bight in the mooring cable which is suddenly released as the mine reaches a predetermined depth during upward travel thereof thereby causing a momentary slack in the mooring cable, which condition is employed to lock the cable drum within the mine anchor.

In accordance with the present invention neither a bight in the cable nor a plummet line is required to moor the cable at a predetermined depth. In the present invention the mooring of the mine at a preselected depth is achieved by a depth control mechanism carried by the mine anchor and comprising a hydrostatic element preferably of the Bourdon type which actuates a contact carrying arm to a position corresponding to the instant depth of the water within which the anchor is planted. A second contact carrying arm is preset to a position corresponding to the desired depth at which the mine is to be moored from which position it is moved under control of impulse signals received from the magnetic mooring cable as the cable is payed out by the rising mine until the firing contact carried by this arm is brought into engagement with the contact of the Bourdon controlled arm. When this occurs a circuit is closed to fire an explosively actuated swaging device thereby to lock the cable to the mine anchor and thus moor the mine at the preset depth as will more clearly appear as the description proceeds.

One of the objects of the present invention is to provide a new and improved depth control mooring mechanism for a positively buoyant moored mine.

Another object is to provide a mooring mechanism for a mine in which the cable clamping device is actuated when sufficient impulses have been received from the magnetized mooring cable to move a firing contact into engagement with a second contact which has been moved to a setting corresponding to a depth of submersion of the anchor.

Still another object resides in a mooring device for a mine in which new and improved means are provided for releasing the mine from the anchor in predetermined time delayed relation with respect to the planting of the mine and in locking the mooring cable to the anchor when sufficient cable has been payed out therefrom to moor the mine at a predetermined depth of submersion.

Still another object is the provision of a new and improved mooring system for a mine in which a contact element is moved to a position corresponding to the depth of the water by hydrostatic means, thereafter locked in such position, and a second movable contact is brought into engagement therewith from a predetermined setting corresponding to the desired depth of submersion of the moored mine under control of magnetic impulses received from the mooring cable as the cable is payed out from the anchor thereby to lock the cable to the anchor when this condition has been obtained.

Other objects and many of the attendent advantages of this invention will be readily appreciated as the same becomes better understood by reference to the following detailed description when considered in connection with the accompanying drawings wherein:

Fig. 1 is a sectional view of the depth control mechanism of the instant invention according to a preferred embodiment thereof;

Fig. 2 is a view taken along the line 2—2 of Fig. 1;

Fig. 3 is a view of the impulse controlled mechanism for actuating the firing contact arm to a firing position;

Fig. 5 is a view taken substantially along the line 5—5 of Fig. 1;

Figure 4:
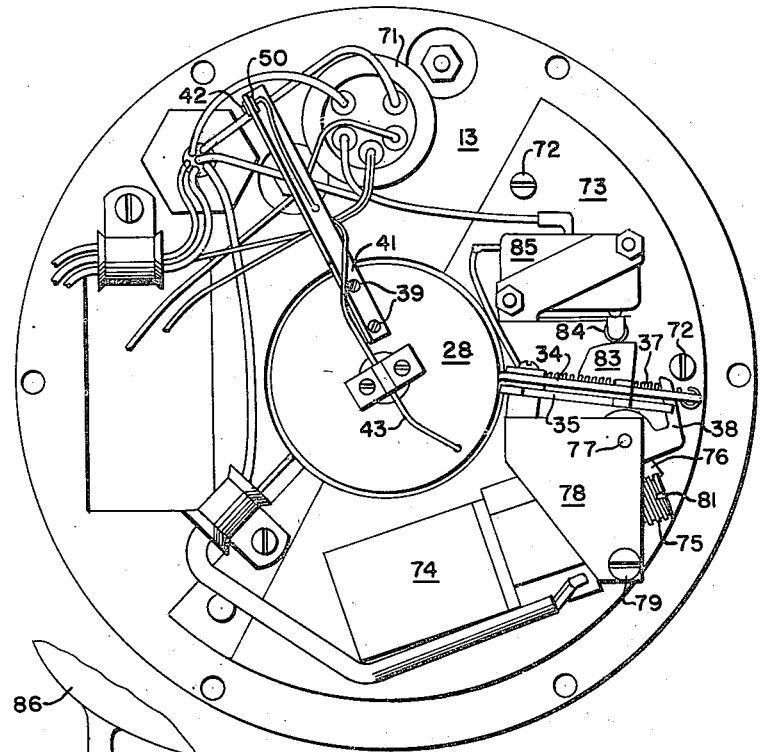
Fig. 4 is a view taken along the line 4—4 of Fig. 1.

Referring now to the drawings for a more complete understanding of the invention on which like numerals of reference are employed to designate like parts throughout the several views and more particularly to Fig. 1 thereof, there is shown thereon a depth control mechanism indicated generally by the numeral 10 and comprising a cylindrical casing 11 to which is secured a base plate 12 and an upstanding cover plate 13 secured thereto in any suitable manner as by the screws illustrated. The base plate is provided with a plurality of holes for receiving a plurality of bolts 14 individual thereto for securing the mechanism to an anchor indicated generally at 15. The base is recessed as at 16 and covered with a flexible diaphragm 17 secured thereto as by the plate 18 and bolts 19. The plate is provided with a plurality of apertures 21 for establishing communication between the exterior surface of the diaphragm and the surrounding water when the anchor has been immersed therein. The recessed portion 16 is in communication with a T fitting 22 threadedly secured to the base plate, a bore 23 being provided for this purpose. The T fitting is connected as by the duct 24 to a hollow support 25 to which is secured one end of a Bourdon tube 26, the other end of which is sealed and secured as by the member 27 to a cup-shaped element 28 having a pin 29 coaxially secured thereto and rotatable within a complementary bore formed within the support 31 whereby the cup-shaped element 28 is rotatable about the support 31 variably in accordance with the degree of pressure of the fluid within the Bourdon tube.

The T-fitting 22, it will be noted, is provided with a plug 32 whereby the fluid system comprising the recess or chamber 16 is in communication with the interior of the Bourdon tube and completely filled with a liquid such, for example, as light oil and sealed therein by the plug 32 whereby slight inward movements of diaphragm 17 in response to hydrostatic pressure applied thereto are translated into corresponding angular displacements of the cup-shaped element 28.

There is also provided a locking clamp 33 comprising two movable members 34 and 35 pivoted as at 36 and normally urged toward a clamping position by spring 37. Each of the members 34—35 is maintained in an unlocked position by member 38 engaging complementary notches formed on the members 34—35 until the member 38 is removed from the notches, as will appear more clearly hereinafter. Secured to the cup-shaped member 28 as by the rivets 39 is a contact arm 41, Figs. 4 and 5. Secured to an end portion of contact arm 41 is contact 42 to which an external electrical connection is completed by way of conductor 43.

Secured to the base 12 as by the screws 44, Fig. 2, is a plate 45 carrying a pair of bearing members 46 and 47 within which is journaled a shaft 48 connected at one end thereof to a ratchet wheel 49, the complementary ratchet wheel 51 being secured to and operated by a solenoid type motor 52 which may be of any type suitable for the purpose such, for example, as a type known in the art as "Ledex" which operates to engage the ratchet wheels 51 and 49 and advance ratchet wheel 49 one tooth for each impulse applied thereto. On the other end portion of the shaft 48 is carried a ratchet pinion 53 having the same number of teeth as ratchet wheel 49 and engaged by a pawl 54 urged thereagainst in a suitable manner as by a spring 55 and pivoted about the screw bearing 56. The pawl may be disengaged at will from the ratchet pinion 53 by depressing plunger 57 against the force of spring 58, Fig. 3. There is also secured to the shaft 48 a gear 59 in meshing engagement with gear 61, Fig. 2, secured to the shaft of counter 62 in such manner that the counter is actuated to a setting corresponding to the degree of rotation of shaft 48 from a zero setting thereof corresponding to an initial position or setting of contact arm 67. The end of shaft 48 is slotted or otherwise formed as at 63 to receive a tool by means of which the shaft and contact arm 67 may be turned at will to an initial desired setting, and the setting will be made manifest by counter 62. There is also secured to shaft 48 a worm gear 64 in meshing engagement with gear 65 pivoted for rotary movement as at 66. Secured to the gear 65 in any suitable manner as by the rivets illustrated is contact arm 67 having a contact 68 carried thereby to which is connected conductor 69 for establishing an external circuit thereto, the contact arms 41 and 67 being independently movable about a common axis. An impulse operated relay 71, Fig. 4, is secured to the cover plate 13, the contacts of which are employed for applying impulses to the motor 52 as the relay operates.

There is secured to the cover plate 13 as by screws 72, Fig. 4, a plate 73 to which is secured a motor 74 having a worm gear 75 secured to the shaft thereof in threaded engagement with an arcuate member 76 pivoted as in 77 to plate 73 and plate 78 secured thereto as by screws 79. The arcuate member 76 has secured thereto in any suitable manner, the arm 38 aforesaid whereby the cup-shaped member 28 is locked by members 34 and 35 as member 38 is withdrawn from the notched portions thereof in response to actuation of motor 74. Gear 75, it will be noted, is provided with a slotted portion 81 in the end thereof to receive a suitable tool whereby motor 74 may be set manually to a desired initial position such that the cup-shaped member 28 is normally unlocked. The arcuate member 76 and locking member 38 are both carried on shaft 82 and secured thereto, Fig. 5. There is also secured to shaft 82 a cam member 83 adapted to engage roller 84 of microswitch 85, Fig. 4, and maintain the switch in closed position until cam member 83 is disengaged from the roller. This occurs when members 35 and 34 are unlatched by member 38 thereby interrupting the operating circuit of motor 74.

Figure 7:
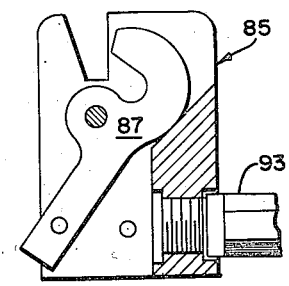
Fig. 7 is a view similar to Fig. 6 showing the mechanism in a released condition.
Figure 6:
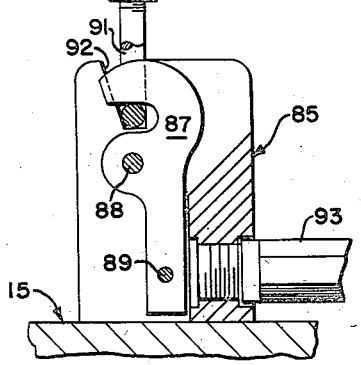
Fig. 6 is a view partially broken away of the explosively actuated mechanism for releasing the mine from the anchor.

On Fig. 6 is shown the explosively controlled locking mechanism indicated generally by the numeral 85 for clamping the mine 86 to the anchor 15. The mechanism comprises a latch 87 pivoted at 88 and normally restrained from movement by the shear pin 89 such that the eye bolt 91 is locked by the latch 87 within slot 92 of the locking mechanism until the latch is pivoted about 88 by the force of an explosion within the explosive driver 93 which is of sufficient force to shear the pin 89. Turnbuckle 94 is preferably provided to maintain the mine securely clamped in locked engagement with the anchor until the latch 87 is moved by the explosive driver to the release position shown on Fig. 7.

Figure 8:
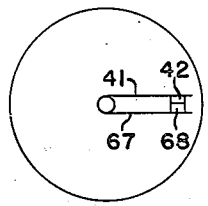
Fig. 8 is a view showing the firing contacts in an initial zero position.
Figure 9:
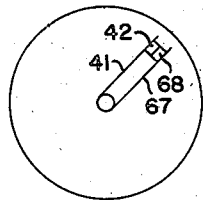
Fig. 9 is a view on which the contacts are shown in a position corresponding to a preset moored depth of the mine.
Figure 10:
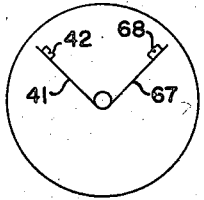
Fig. 10 is a view on which the contacts are shown in the position which they assume when the anchor is planted.
Figure 11:
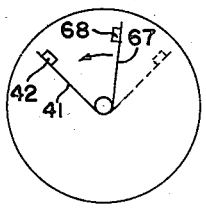
Fig. 11 is a view similar to Fig. 10 on which is shown the direction of movement of the impulse actuated firing contact during paying out of the mooring cable.
Figure 12:
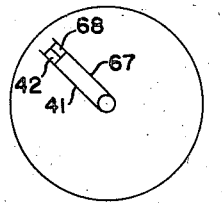
Fig. 12 is a view on which the impulse controlled contact is shown moved to a final or firing position.

On Figs. 8 through 12 are shown the relative positions of the contact arms 41 and 67 controlled by the pressure of the surrounding water and the length of cable payed out from the anchor respectively during the cycle of operations of the device. Fig. 8, for example, shows the position of the contacts and contact arms prior to setting of the device to a predetermined depth setting. Fig. 9 shows the position of the contacts when the device has been set to a mine depth setting by a tool inserted into the end of shaft 48. On Fig. 10 is shown the Bourdon controlled arm 41 moved away from arm 67 by the pressure of the surrounding water when the anchor has come to rest on the bed of a body of water within which the anchor is planted. On Fig. 11 is shown the arm 67 moved from the position of Fig. 10 toward the arm 41 in response to impulses received from the magnetized cable while the cable is being payed out from the anchor. On Fig. 12 the arm 67 is shown moved to a final or firing position with the contact thereof engaging the contact of arm 41 when a sufficient length of the magnetized cable has been payed out to moor the mine at the depth of submersion originally set into the device.

Figure 13:
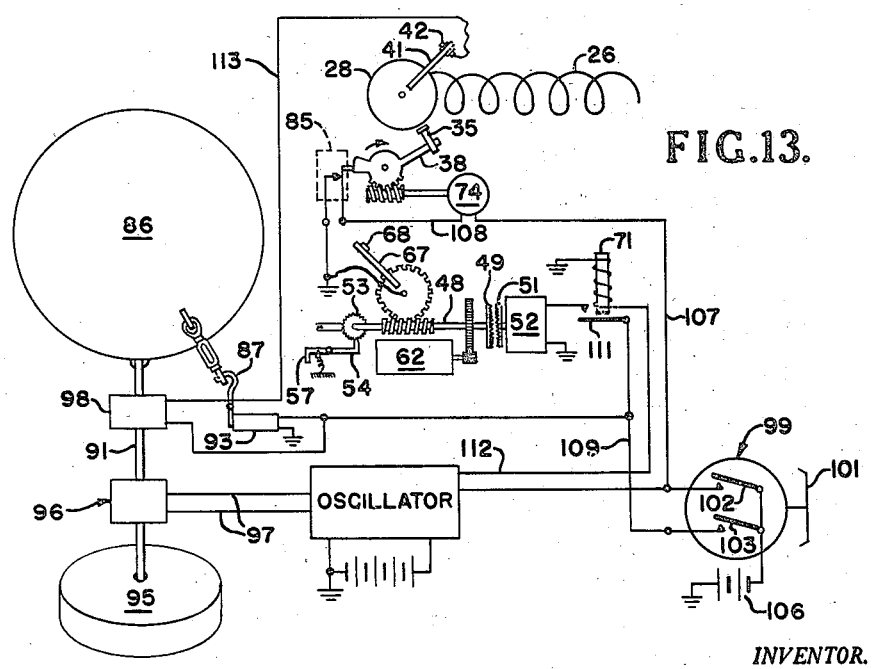
Fig. 13 is a schematic view of a circuit suitable for use with the present invention.

A circuit suitable for use with the instant invention is shown on Fig. 13 which illustrates in diagrammatic form the various components of the mine mooring system herein disclosed and the electrical interconnections therebetween. As shown on Fig. 13 the cable is stored within a cable dispenser 95 in coiled form, each turn of the cable being given a twist during the storing operation whereby when the inner end of the coil of cable is withdrawn from the dispenser, the cable will be free of kinks and twists. The protruding end of cable 91 is shown attached to the mine casing 86 although in practice, a short length of nonmagnetic cable is interposed between the end of the magnetized cable 91 and the mine casing to prevent spurious magnetic effects from being received by the mine as the result of the proximate relation of the cable with respect thereto when the mine is moored. Cable 91 is composed of magnetic material having alternate north and south poles magnetized therealong at one foot intervals or at such other intervals as may be desired. Encircling the cable is a magnetic pickup device indicated generally by the numeral 96 comprising a magnetic head disposed adjacent and in close proximity to the cable 91 and a coil of wire operatively connected thereto for generating electrical signals in response to movement of the north and south magnetized sections of the cable 91 as the cable moves past the pickup device. The pickup device may be of any type suitable for the purpose, such for example, as the magnetic metering device disclosed in the copending application of Leon J. Lofthus for Magnetic Cable Measuring Device, Serial No. 285,039, filed April 29, 1952. The coil is connected to the input of an oscillator by the pair of conductors 97. The oscillator may be of any well known type in which the oscillations are started by a signal of one polarity applied to the conductors 97 at the input thereof and the oscillations are interrupted by a signal of the opposite polarity applied to conductors 97.

The mooring cable 91 also passes through an explosively controlled swaging device 98 whereby the cable is locked to the mine anchor by a swaging operation in response to the operation of an electroresponsive explosive element which may be of the type, for example, disclosed and claimed in the copending application of Charles L. Bowersett for Explosive Swaging Device for Mooring a Submerged Mine, Serial No. 285,040 filed April 29, 1952.

There is also provided, as clearly shown on Fig. 13, a delay element comprising a clock mechanism indicated generally by the numeral 99 operatively connected to a hydrostat 101 and adapted to be set into operation as the hydrostat is actuated to an operated position by the pressure of the surrounding water. The clock mechanism may be of any well known type employing a spring motor and escapement mechanism in which means are provided for actuating a pair of normally open contact members to circuit closing position in predetermined time sequence. The clock 99 illustrated, for example, may advantageously include a contact member 102 adapted to close its contacts at predetermined period of time such, for example, as one hour after the hydrostat 101 has operated and a second contact member 103 adapted to close its contacts a predetermined period of time after the closure of contact member 102. Whereas on Fig. 13 is shown a clock mechanism adapted to be sent into operation by movement of a hydrostat 101, it will be understood that this has been done for the purpose of illustration only and that the clock may, if desired, be set in operation by a solenoid and that the hydrostat may have connected thereto a switch which is closed when the hydrostat is operated thereby energizing the solenoid to set the clock into operation.

The operation of the device of the present invention will now be described. Let it be assumed, by way of example, that the spring driven clock mechanism 99 is wound, that the mine is locked to the anchor by the latch 87, that the shear pin 89 is in position to releasably lock the latch, that the motor 74 and arm 38 controlled thereby are in position to unlock the disk 28 and arm 41 secured thereto and that the arm 67 has been set by a tool inserted into slot 63 at the end of shaft 48 to the intermediate position shown on Fig. 9 corresponding to a selected depth of 40 feet at which the mine is to be moored, this setting being made manifest by the counter 62 as viewed through aperture 104, Fig. 1, in the cover plate 13 provided for this purpose. A transparent cover 105 is preferably employed to enclose the aperture and thereby exclude the entrance of dirt and other foreign material within the interior of the device.

As the mine and anchor sink to the bed of the body of water the contact arm 41 is moved by the Bourdon tube to the final position shown in Fig. 10 and hydrostat 101 is operated.

The operation of the hydrostat sets the clock mechanism 99 into operation and at the completion of the period of one hour, in the assumed example, contacts 102 are closed.

When contacts 102 are closed a battery is applied by way of conductor 107 to motor 74 from whence the circuit is continued by way of conductor 108 and closed contacts of switch 85 to ground thereby setting motor 74 into operation to move arm 38 sufficiently to unlock members 34—35 and concurrently therewith to open the contacts of switch 85 and thereby bring the motor to rest. As members 34—35 are unlocked they are quickly brought into clamping relation with cup-shaped element 28 by spring 37 thereby locking contact arm 41 in the final position shown on Fig. 10. The operation of contacts 102 of clock 99 to circuit closing position also applied battery to the oscillator to render the oscillator responsive to signals to be received over conductors 97 from the pickup device 96. When contacts 103 are closed battery is applied by way of conductor 109 to the explosive driver 93 and thence to ground. Battery is also applied to armature 111 of relay 71. Explosive driver 93 now operates to shear the pin 89 and quickly move latch 87 to the release position, Fig. 7, thereby unlocking the mine from the anchor.

As the positively buoyant mine 86 rises within the water, mooring cable 91 is paid out from the cable dispenser 95 and passes through the magnetic pickup device 96 and the swaging element 98. As the positive and negative magnetic poles of the cable 91 traverse the magnetic pickup device 96, the pickup device generates electrical signals to alternately stop and set into operation the oscillator thereby applying impulses from the oscillator output by way of conductor 112 to the winding of relay 71 and thence to ground, one such pulse being transmitted for each pair of signals of opposite polarity received over conductors 97. Relay 71 operates in response to the first energization of its winding thereby causing armature 111 thereof to engage its contact and energize the rotary solenoid motor 52. The energization of relay 71 causes armature 111 thereof to be disengaged from the make contact thereof and deenergize motor 52. An arrangement is thus provided in which motor 52 is operated by impulses received from battery 106 by way of contacts of relay 71 and makes a cycle of operations for each pair of magnetic poles traversing the pickup device 96 as the cable is payed out from the dispenser 95 by the rising mine.

Each operation of motor 52 causes the ratchet 51 thereof to be moved axially into engagement with ratchet wheel 49 and concurrently therewith to move ratchet wheel 49 and shaft 48 connected thereto ahead a distance subtended by one ratchet tooth. Reverse movement of shaft 48 is prevented by ratchet pinion 53 and pawl 54 associated therewith. Ratchet wheel 51 is now withdrawn from ratchet wheel 49 and moved reversely through an angle corresponding to the distance of one tooth of the wheel 49 whereby the shaft 48 and arm 67 operatively connected thereto are moved ahead step-by-step each time motor 52 operates.

When sufficient impulses have been received from the oscillator in response to signals picked up by the pickup device 96 to move contact arm 67 ahead sufficiently for contact 68 thereof to engage contact 42, a circuit is closed from a battery 106 by way of contacts 103 of the clock mechanism, conductor 109 and the electroresponsive element of explosive swager 98, conductor 113, contacts 42 and 68 and thence to ground thereby operating the explosive swager 98 and swaging the cable 91 to the mine anchor. The mine is now moored at the selected depth of 40 feet.

It will be noted that the mechanism herein described provides a high degree of accuracy with a maximum error, in the example assumed, of 2 feet in the depth at which the mine is finally moored. This accuracy has been achieved by locking the contact arm 41 controlled by the Bourdon tube in a position corresponding to the depth of the anchor prior to the paying out of the mooring cable therefrom whereby the position of the arm and the contact 42 carried thereby is unchanged as the result of vibrations of the anchor set up by the cable as it is payed out. Furthermore, by locking the Bourdon controlled contact arm in a final position in the manner disclosed, firm reliable contact pressure between contacts 68 and 42 is attained as soon as these contacts are brought into engagement. To further insure reliable contact and full pressure between contacts 68 and 42 as soon as these contacts are engaged it has been found desirable to provide a spring 114, Fig. 1, having one end thereof secured as by the screw 115 and nut 116 to gear 65, Fig. 1 the other end of the spring being secured to base plate 12. Spring 114 it will be noted, is highly resilient and of just sufficient tension to take up any backlash which may be present between the teeth of gear 65 and the worm gear 64 meshed therewith.

Obviously many modifications and variations of the present invention are possible in the light of the above teachings. It is therefore to be understood that within the scope of the appended claims the invention may be practiced otherwise than as specifically described.

What is claimed as new and desired to be secured by Letter Patents of the United States is:

1. In a device of the character disclosed for mooring a mine at a predetermined depth of submersion, in combination, a mine anchor, a mine, means for releasably clamping the mine to said anchor, a length of mooring cable disposed within said anchor and adapted to be paid out therefrom, one end of said cable being connected to the mine, said cable being composed of magnetic material and having poles of opposite polarity magnetized at regular intervals in interweaving relation throughout the length thereof, a pickup device encircling said cable and having means for generating electrical signals induced by said magnetic poles as the cable moves past the pickup device, a rotatable contact member, means including a Bourdon tube in communication with the surrounding water for moving said member to a final position correlative with the depth of water at which the anchor is planted, a firing contact element comprising a movable contact arm rotatable about a common axis with said contact element from an initial position of rest in contact therewith to a second position corresponding to the depth of water at which the mine is to be moored, manipulative means for setting said firing contact arm to said second position prior to launching the mine, a source of electrical power, impulse responsive means for actuating said firing contact arm from said second position to a firing position in electrical contact with said contact member when the contact member has been moved to said final position, a control circuit, hydrostatically controlled means for applying electrical power from said source to said control circuit, explosively actuated means for unlocking the mine from said anchor, electroresponsive means included in said explosively actuated means and operatively connected to said control circuit for operating the explosively actuated means when the control circuit is energized, and means controlled by signals received from said pickup device for applying impulses to said impulse responsive means corresponding in number to the length of cable payed out from the anchor as the mine rises within the water, electroresponsive swaging means for locking the cable to the anchor as the swaging means operates, and a firing circuit for said swaging means including said firing contact element for swaging the cable to the anchor as the firing contact element engages said contact member.

2. A device according to claim 1 including ratchet means for preventing reverse movement of said contact arm while the anchor is submerged.

3. A device according to claim 2 including manipulative means for disabling at will said ratchet means prior to launching of the mine.

4. A device according to claim 1 including a pair of normally cocked spring actuated elements for clamping said contact member in said final position, and motor driven gear means for triggering said clamping elements when the rotatable contact member has been moved into said final position.

5. A depth control mechanism including an anchor for mooring a mine at a preselected depth comprising a first contact movable from an initital position to an intermediate position corresponding to the depth at which the mine is to be moored and thence to a final position corresponding to the depth of the water within which the anchor is planted, a firing contact movable from said initial position to said intermediate and final positions in the order named and normally engaged by said first contact, manipulative means for moving and setting both contacts simultaneously at will from said first position to said intermediate position, hydrostatically controlled means for moving said first contact from said intermediate position to said final position as the anchor settles to the bed of a body of water, a mooring cable connected to said mine and having magnetic poles formed therein at regular intervals throughout the length thereof, means within the anchor for paying out a length of said cable therefrom, a pickup device encircling said cable and having means for generating electrical signals as said poles are moved transversely with respect thereto, means controlled by said signals for actuating said firing contact progressively step-by-step from said intermediate position into engagement with said first contact when the first contact is in said final position, electroresponsive means for swaging the cable to said anchor, and means controlled by said pickup device and said contacts for operating said swaging means when sufficient signals have been generated by the pickup device to move the firing contact into engagement with said first contact after the first contact has been moved to said final position.

6. A depth control mechanism according to claim 5 including means for locking said first contact in time delayed relation when the first contact has been moved into said final position.

7. A depth control mechanism according to claim 5 including means for indicating the position of the firing contact when the firing contact has been set by said manipulative means to said intermediate position.

8. A depth control mechanism according to claim 5 including an oscillator having the input thereof operatively connected to said pickup device for generating impulses corresponding to signals received from the pickup device, a pulse repeating relay operatively connected to the output of said oscillator and operable by said impulses in synchronism therewith, means on said relay for repeating said impulses, and means including a plurality of electrical connections for applying said repeated impulses to said step-by-step firing contact actuating means.

9. A device of the character disclosed for mooring a positively buoyant mine at a predetermined depth within a body of water, in combination, an anchor carrying said device and normally clamped to the mine, a pair of contacts movable separately from a first position to a final position, said contacts being normally engaged in said first position, manipulative means for setting said contacts to an intermediate position corresponding to the depth at which the mine is to be moored, hydrostatically controlled means for moving a first one of said contacts to said final position corresponding to the depth of water within which the anchor is planted, means for locking said one contact in said final position, a normally open firing circuit, an electroresponsive swaging device on said anchor and included in said circuit, a positively buoyant mine normally clamped to said anchor and having a length of magnetic cable secured thereto and payable out from the anchor, said cable having magnetic poles of alternate polarity disposed at uniform intervals throughout the length thereof, pickup means in operative relation to said cable for generating electrical signals as the magnetic poles are moved transversely with respect thereto, hydrostatically controlled means for rendering said circuit effective in time delayed relation after the first contact has been moved to said final position, means for unclamping the mine from said anchor, and means controlled by said signals received from said pickup means for moving the other contact from said intermediate position into engagement with the first contact in said final position thereby to close said firing circuit and operate the swaging device when sufficient cable has been payed out from the anchor to moor the mine at said predetermined depth.

10. A mooring device according to claim 9 in which the means for unclamping the mine from said anchor are explosively actuated in predetermined time delayed relation after the anchor has been planted within the water.

11. A depth controlled device according to claim 9 in which means are provided within said anchor for paying out the cable as the mine rises within the water.

No references cited.